(12) United States Patent
Cook et al.

(10) Patent No.: US 6,441,126 B1
(45) Date of Patent: Aug. 27, 2002

(54) BRANCHED ALIPHATIC POLYESTERS

(75) Inventors: Phillip M. Cook; John M. Staples, both of Kingsport; Charles R. Tomlinson, Blountville, all of TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 09/559,718

(22) Filed: Apr. 26, 2000

Related U.S. Application Data

(60) Provisional application No. 60/132,095, filed on Apr. 30, 1999, and provisional application No. 60/131,100, filed on Apr. 26, 1999.

(51) Int. Cl.$^7$ ................................................ C08G 63/16
(52) U.S. Cl. ................... 528/302; 426/3; 426/6
(58) Field of Search ........................... 524/284; 528/302

(56) References Cited

U.S. PATENT DOCUMENTS

| | | | | |
|---|---|---|---|---|
| 4,454,313 A | * | 6/1984 | Okitsu | 528/302 |
| 4,668,763 A | * | 5/1987 | Muller | 528/296 |
| 5,217,642 A | | 6/1993 | Kud et al. | |
| 5,508,394 A | | 4/1996 | Kappes et al. | |
| 5,569,408 A | * | 10/1996 | Peppmoller | 508/462 |
| 5,703,160 A | * | 12/1997 | Dehennau | 525/54.24 |
| 5,880,224 A | * | 3/1999 | Miura | 525/439 |
| 6,013,287 A | | 1/2000 | Bunczek et al. | |
| 6,017,566 A | | 1/2000 | Bunczek et al. | |

FOREIGN PATENT DOCUMENTS

| WO | WO 98/17123 | 4/1998 |
|---|---|---|
| WO | WO 98/17124 | 4/1998 |

OTHER PUBLICATIONS

Apicella, et al., "Kinetic and Catalytic Aspects of the Formation of Poly(ethylene terephthalate) (PET) Investigated with Model Molecules," *J. Applied Polymer Science,* 69:2423–2433 (1998).

Kienle, et al., "The Polyhydric Alcohol–Polybasic Acid Reaction. VI. The Glyceryl Adipate and Glyceryl Sebacate Polyesters," *J. Am. Chem. Soc.*, 63:481–484 (1941).

Kiyotsukuri, et al., "Network Polyester Films from Glycerol and Dicarboxylic Acids," *Polymer International*, 33:1–8 (1994).

Nagata, "Synthesis, Characterization, and Enzymatic Degradation of Novel Regular Network Aliphatic Polyesters Based on Pentaerythritol," *Macromolecules*, 30:6525–6530 (1997).

* cited by examiner

*Primary Examiner*—Paul R. Michl
(74) *Attorney, Agent, or Firm*—Bernard J. Graves, Jr. Esq.; Michael J. Blake, Esq.

(57) ABSTRACT

A gum base comprising at least one crosslinked branched aliphatic biodegradable polyester comprising repeat units formed from at least one polyol having three to four hydroxy groups, or ester thereof, at least one dibasic acid, or ester thereof, and at least one long chain monocarboxylic acid, or ester thereof. The process of producing a crosslinked branched aliphatic biodegradable polyester gum base by reactive extrusion is also included.

15 Claims, No Drawings

BRANCHED ALIPHATIC POLYESTERS

This application claims the benefit of U.S. Provisional Application Serial Nos. 60/131,100, filed Apr. 26, 1999, and Ser. No. 60/132,095 filed Apr. 30, 1999 and both provisional applications are herein incorporated by this reference in their entireties.

FIELD OF THE INVENTION

This invention relates to crosslinked branched aliphatic polyesters that are biodegradable, a process for making them and their use as a chewing gum base.

BACKGROUND OF THE INVENTION

Aromatic polyesters such as poly (ethylene terephthalate) (PET), which are high melting and which have a high degree of cystallinity, are widely used in various molding and extrusion applications. Such applications include films, sheeting bottles, containers and the like. Aliphatic polyesters generally have low melting points and are therefore much less useful in typical industrial applications. However, it was recently reported that certain aliphatic polyesters based on monomers approved for food applications are useful as a chewing gum base. It would therefore be beneficial to provide for improved aliphatic polyesters for chewing gum bases and improved methods of making such material.

The preparation of polyesters is described in a recent book by George Odian, *Principles of Polymerization*, $2^{nd}$ edition, pages 102–105 (1981), John Wiley & Sons, N.Y. Branched or crosslinked polymers can be prepared by using at least some monomers having a functionality of at least three. An apparatus for making such branched polymers is shown on page 132 of this same reference.

WO 98/17123 and WO 98/17124 patents to Wm. Wrigley Jr. Company describe a gum base including at least one aliphatic polyester that is produced from glycerol, propylene glycol or 1,3-butylene glycol and an aliphatic dibasic acid containing 4 to 12 carbon atoms.

JP 1038431A describes polyester resins for paint having narrow molecular weight distributions, prepared from aromatic acids such as phthalic acid, isophthalic acid, and terephthalic acid, or aliphatic acids such as maleic acid, adipic acid or azaelic acid with polyols such as glycerol, trimethylolpropane, ethylene glycol, 1,4-butanediol or 2,3-dimethyltrimethylene glycol in an inert solvent containing an esterification catalyst. An optional monobasic acid and/or monohydric alcohol could be added to the reaction mixture.

Nagata, M. et al., *Reactional Functional Polymers*, Vol. 30, 165 (1996) describes the synthesis and enzymatic degradation of certain aliphatic polyesters based on glycerol and aliphatic dibasic acids containing 6 to 16 carbon atoms.

None of the above-cited references disclose a crosslinked branched aliphatic polyester chewing gum base, which is edible and biodegradable, and processes and formulations thereof. Thus, it is an object of the present invention to provide a crosslinked branched aliphatic polyester chewing gum base comprised of repeat units formed from at least one polyol, or ester thereof, at least one dibasic acid, or ester thereof, and at least one long chain monocarboxylic acid, or ester thereof. The gum bases are produced by reactive extrusion of a pre-gel.

SUMMARY OF THE INVENTION

The present invention provides for crosslinked branched aliphatic biodegradable chewing gum bases, formulations and processes thereof.

In one embodiment, the invention provides a gum base including at least one crosslinked branched aliphatic biodegradable polyester comprising repeat units formed from (1) at least one polyol having three to four hydroxy groups, or ester thereof, (2) at least one dibasic acid, or ester thereof, and (3) at least one long chain monocarboxylic acid, or ester thereof.

In another embodiment, the invention provides a process for making a crosslinked branched aliphatic biodegradable polyester comprising:
(a) reacting at least one polyol having from three to four hydroxy groups, or ester thereof, at least one dibasic acid, or ester thereof, and at least one long chain monocarboxylic acid, or ester thereof, at a sufficient temperature for a sufficient period to form a pre-gel;
(b) extruding the pre-gel at a sufficient temperature for a sufficient period, to convert the pre-gel to a crosslinked branched aliphatic biodegradable polyester.

In another embodiment, the invention provides a crosslinked branched aliphatic biodegradable polyester composition comprising (a) a polyester comprising repeat units formed from (1) at least one polyol having three to four hydroxy groups, or ester thereof, (2) at least one dibasic acid, or ester thereof; and (3) at least one long chain monocarboxylic acid, or ester thereof, and (b) greater than 0 to less than about 10 weight % based on the weight of the total composition of free long chain monocarboxylic acid.

In another embodiment, the invention provides a crosslinked branched aliphatic biodegradable polyester comprising repeat units formed from (1) at least one polyol having three to four hydroxy groups, or ester thereof, (2) at least one dibasic acid, or ester thereof, and (3) at least one long chain monocarboxylic acid, or ester thereof, wherein the crosslinked branched aliphatic biodegradable polyester has a molecular weight range of from about 100K to greater than about 1M.

In another embodiment, the invention provides a crosslinked branched aliphatic biodegradable polyester comprising repeat units formed from (1) at least one polyol having three to four hydroxy groups, or ester thereof, (2) at least one dibasic acid, or ester thereof; and (3) at least one long chain monocarboxylic acid, or ester thereof, wherein the crosslinked branched aliphatic biodegradable polyester has an acid value that is from about 100 to about 10,000.

In another embodiment, the invention provides a process for making a crosslinked branched aliphatic biodegradable polyester comprising:
(a) reacting at least one polyol having from three to four hydroxy groups, or ester thereof, and at least one dibasic acid, or ester thereof at a sufficient temperature for a sufficient period to form a pre-gel;
(b) extruding the pre-gel at a sufficient temperature for a sufficient period, to convert the pre-gel to a crosslinked branched aliphatic biodegradable polyester.

In another embodiment, the invention provides a chewing gum composition comprising the crosslinked branched aliphatic biodegradable polyester or gum base of the present invention.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION OF THE INVENTION

The present invention may be understood more readily by reference to the following detailed description of preferred embodiments of the invention and the Examples included therein.

It must be noted that, as used in the specification and the appended claims, the singular forms "a," "an" and "the" include plural referents unless the context clearly dictates otherwise.

Ranges are often expressed herein as from "about" one particular value, and/or to "about" another particular value. When such a range is expressed, another embodiment includes from the one particular value and/or to the other particular value. Similarly, when values are expressed as approximations, by use of the antecedent about, it will be understood that the particular value forms another embodiment.

A weight percent of a component, unless specifically stated to the contrary, is based on the total weight of the formulation or composition in which the component is included.

The molecular weight ranges expressed herein refer to the weight-average molecular weight.

"Optional" or "optionally" means that the subsequently described event or circumstance may or may not occur, and that the description includes instances where said event or circumstance occurs and instances where it does not. For example, the phrase "optionally substituted lower alkyl" means that the lower alkyl group may or may not be substituted and that the description includes both unsubstituted lower alkyl and lower alkyl where there is substitution.

In one embodiment, the invention provides a gum base including at least one crosslinked branched aliphatic biodegradable polyester comprising repeat units formed from (1) at least one polyol having three to four hydroxy groups, or ester thereof, (2) at least one dibasic acid, or ester thereof; and (3) at least one long chain monocarboxylic acid, or ester thereof.

In another embodiment, the invention provides a gum base comprising a crosslinked branched aliphatic biodegradable polyester comprising repeat units formed from (1) glycerol, (2) adipic acid; and (3) palmitic acid.

In another embodiment, the invention provides a process for making a crosslinked branched aliphatic biodegradable polyester comprising:
(a) reacting at least one polyol having from three to four hydroxy groups, or ester thereof, at least one dibasic acid, or ester thereof, and at least one long chain monocarboxylic acid, or ester thereof, at a sufficient temperature for a sufficient period to form a pre-gel;
(b) extruding the pre-gel at a sufficient temperature for a sufficient period, to convert the pre-gel to a crosslinked branched aliphatic biodegradable polyester.

In another embodiment, the invention provides a crosslinked branched aliphatic biodegradable polyester composition comprising (a) a polyester comprising repeat units formed from (1) at least one polyol having three to four hydroxy groups, or ester thereof, (2) at least one dibasic acid, or ester thereof; and (3) at least one long chain monocarboxylic acid, or ester thereof, and (b) greater than 0 to less than about 10 weight % based on the weight of the total composition of free long chain monocarboxylic acid.

In another embodiment, the invention provides a crosslinked branched aliphatic biodegradable polyester comprising repeat units formed from (1) at least one polyol having three to four hydroxy groups, or ester thereof, (2) at least one dibasic acid, or ester thereof, and (3) at least one long chain monocarboxylic acid, or ester thereof, wherein the crosslinked branched aliphatic biodegradable polyester has a molecular weight range of from about 100K to greater than 1M.

In another embodiment, the invention provides a crosslinked branched aliphatic biodegradable polyester comprising repeat units formed from (1) at least one polyol having three to four hydroxy groups, or ester thereof, (2) at least one dibasic acid, or ester thereof, and (3) at least one long chain monocarboxylic acid, or ester thereof, wherein the crosslinked branched aliphatic biodegradable polyester has an acid value that is from about 100 to about 10,000.

In another embodiment, the invention provides a process for making a crosslinked branched aliphatic biodegradable polyester comprising:
(a) reacting at least one polyol having from three to four hydroxy groups, or ester thereof, and at least one dibasic acid, or ester thereof at a sufficient temperature for a sufficient period to form a pre-gel;
(b) extruding the pre-gel at a sufficient temperature for a sufficient period, to convert the pre-gel to a crosslinked branched aliphatic biodegradable polyester.

In another embodiment, the invention provides a chewing gum composition comprising the crosslinked branched aliphatic biodegradable polyester or gum base of the present invention.

In another embodiment, any branched aliphatic biodegradable polyester or gum base described above exhibits a high degree of crosslinking and can be defined by comparing the highly crosslinked branched aliphatic polyesters of the instant invention to thermoset polymers. Thermoset polymers can be classified as "A-," "B-," and "C"-stage polymers according to the extent of the reaction, "p", as compared to the extent of the reaction at gelation, "pc." The polymer is an "A-" stage polymer if "p" is less than "pc." The polymer is a "B"-stage polymer if the system is close to the gel point, "pc." The polymer is a "C-" stage polymer if the polymer is well past "pc." The "A-" stage polymer is soluble and fusible. The "B-" stage polymer is still fusible but is barely soluble. The "C-" stage polymer is crosslinked and both infusible and insoluble. The crosslinked branched aliphatic biodegradable polyesters of the present invention fall between the "B-" and "C-" stages of the thermoset polymer classification. (See page 127 of Odian, *Principles of Polymerization*, referenced above). Preferred molecular weight ranges for branched aliphatic biodegradable polyester exhibiting high crosslinking is from about 100K to greater than about 1M, more preferably from about greater than 100K to about 10M. K means one thousand and M means one million.

For example, the invention provides a branched highly crosslinked aliphatic biodegradable polyester comprising repeat units formed from (1) at least one polyol having three to four hydroxy groups, or ester thereof, (2) at least one dibasic acid, or ester thereof; and (3) at least one long chain monocarboxylic acid, or ester thereof, wherein the branched aliphatic biodegradable polyester is crosslinked and has a molecular weight range of from about 100K to greater than about 1M. This molecular weight range inherently contemplates a high level of crosslinking, i.e., insoluble in a solvent.

Typical polyols are $C_3$ to $C_5$ polyols with 3–4 hydroxy groups, or ester thereof. Preferred polyols include glycerol, pentaerythritol, and the like or mixtures thereof. An even more preferred polyol is glycerol. Suitable esters of glycerol include glycerol palmitate, glycerol sebacate, glycerol adipate, triacetin tripropionin and the like. The polyol is present in the range of from about 20% to about 30% weight of the reaction mixture, more preferably from about 20% to about 26% weight of the reaction mixture.

Preferred dibasic acids include saturated and unsaturated acids containing about 3 to about 9 carbon atoms, or ester thereof, more preferably 4 to 6 carbon atoms Even more preferred dibasic acids include malonic, succinic, tartaric, malic, citric, fumaric, glutaric, adipic, pimelic, sebacic, suberic, azelaic, and the like acids, or mixtures thereof. The most preferred dibasic acid is adipic acid. Other dibasic acids may be dicarboxylic acids containing a $C_3$ to $C_6$ cyclic structure and positional isomers thereof, and include cyclohexane dicarboxylic acid, cyclobutane dicarboxylic acid or cyclopropane dicarboxylic acid. The dibasic acid is present in the range of from about 40% to about 65% weight of the reaction mixture, more preferably from about 44% to about 60% weight of the reaction mixture.

The presence of the monocarboxylic acid is helpful in controlling the degree of branching of the polyester produced and provides a desirable chewing gum base which has a desirable waxy feeling and excellent chewing characteristics. Preferred long chain monocarboxylic acids include those containing about 12 to 26 carbon atoms, or ester thereof, preferably 14 to 18 carbon atoms. Even more preferred long chain monocarboxylic acids may be saturated or unsaturated. Typical saturated long chain monocarboxylic acids include lauric, myristic, palmitic, stearic, arachidic, cerotic, and the like or mixtures thereof. Typical unsaturated long chain monocarboxylic acids include dodecylenic, palmitoleic, oleic, linoleic, linolenic, erucic, and the like or mixtures thereof. The most preferred long chain monocarboxylic acid is palmitic acid. The long chain monocarboxylic acid is present in the range of from about 0% to about 70% weight of the reaction mixture, more preferably from about 15% to about 30% weight of the reaction mixture.

When a long chain monocarboxylic acid such as palmitic acid is used during the initial reaction with the dibasic acid and glycerol component, a residual amount, of greater than 0% to less than about 10%, of palmitic acid is free or unreacted in the mixture, more preferably from about 3% to less than about 10% of free or unreacted palmitic acid in the mixture. An explanation for the unreacted palmitic acid has to do with the palmitic acids initial reaction with glycerol and its later displacement by transesterification reactions that occur during the gelation process. For example, the ester of palmitic acid could react with a pendent acid group to yield a new adipate ester and free or unreacted palmitic acid. The amount of free or unreacted palmitic acid available at a single point is small, about less than 1%, until gelation begins to occur. At the gelation point, the free or unreacted palmitic acid content begins to rise to from about 1% to about 10%, since gelation leads to very high viscosity and severely impedes diffusion of the palmitic acid. Since the palmitic acid cannot diffuse back into the mass or is trapped within the mass of polymeric material, it cannot find another hydroxyl group with which to react. Although, an excess of hydroxyl groups are present, many become essentially protected from further reaction because of the diffusional barrier caused by gelation. The presence of free or unreacted palmitic acid improves the compatibility of the crosslinked branched aliphatic biodegradable polyester with certain chewing gum additives, such as flavorants. Although, this discussion refers to the use of a specific long chain monocarboxylic acid, palmitic acid, the same behavior is realized with the other long chain monocarboxylic acids of the present invention.

In addition to the $C_3$ to $C_5$ polyol component, additional polyols, alcohols or a derivative thereof may be used if desired. The amounts of these additional glycols or polyols may range from about 0% to about 50% weight percent of the reaction mixture. Preferred additional polyols, alcohols or their derivatives thereof include propylene glycol, 1,3-butanediol, triacetin, trimethylolpropane, pentaerythritol, cellulose ethers, cellulose esters, such as cellulose acetate, sucrose acetate iso-butyrate and the like. In addition, up to about 50 weight % of long chain monoalcohols may be used. These monoalcohols will generally contain from about 12 to about 20 carbon atoms and include compounds such as lauryl alcohol, myristyl alcohol, cetyl alcohol, stearyl alcohol and the like.

In another embodiment, the invention provides that the crosslinked branched aliphatic biodegradable polyester is produced by reactive extrusion of a pre-gel.

A catalyst is not required for the esterification and polycondensation steps used to prepare the crosslinked branched aliphatic biodegradable polyesters of this invention. Titanium catalyst such as titanium alkoxides are frequently used as ester exchange and polycondensation catalysts but titanium imparts undesirable discoloration to the polyesters of this invention. The presence of zinc and aluminum compounds detract from the flavor of these chewing gum bases.

The terms prepolymer or pre-gel are defined herein as the state of the resin prior to gelation, that is prior to forming a gel or prior to reaching the gel point. The term "gel point" is often described as the point wherein crosslinking is evident by the occurrence of gelation in the polymerization process. As the reactants begin to react and give off water, the molecular weight of the chains begins to increase and the chains begin to branch. As the reaction continues and water is given off, the molecular weight begins to increase even more rapidly and bonds form between branched chains to form crosslinked structures. At some point during the progression of the reaction, the molecular weight becomes sufficiently large such that a gel begins to form. Such a gel has limited solubility in solvents. As the gel continues to react and water is given off, crosslinking increases and the consistency of the gel resembles a hard rubber and eventually a glass-like solid. When the gel point is reached in the polymerization process, one observes the visible formation of a "gel" or "insoluble polymer fraction."

Alternatively, the term gel point can also be described as the point in which the reaction system loses fluidity as measured by the failure of an air bubble to rise in the reaction mixture.

In this invention, the term gel point is meant to define the point at which the batch of polymer becomes so difficult to agitate at temperatures of 150–200° C. that the batch of polymer begins to migrate up the agitator shaft of the stirred tank. The gel is insoluble in solvents at elevated temperature under conditions where polymer degradation does not occur. The gel corresponds to the formation of an infinite network in which branched aliphatic polymer molecules have reacted with each other to form a macroscopic molecule. The gel is, in fact, considered as one molecule. The non-gel or sol portion of the polymer remains soluble in solvents. As the polymerization proceeds beyond the gel point, the amount of gel increases at the expense of the sol as more and more polymer chains in the sol become crosslinked to form the gel. There is a dramatic physical change that occurs during the process of gelation. The reaction mixture is transformed into a polymer of infinite viscosity.

The term "acid value," also known as acid number, is determined by weighing a sample of the crosslinked branched aliphatic biodegradable polyester and titrating it with dilute potassium hydroxide. The acid value calculations are made based on the milligrams of potassium hydroxide/gram of crosslinked branched aliphatic biodegradable polyester. Preferred acid values are from about 100 to about 10,000, more preferably from about 100 to about 1000.

To determine the approximate amount of water that should be collected in preparing the pre-gel, calculations can be made to determine the theoretical gel point using the Carothers equation or Florys approach, both of which are described in Odian, *Principles of Polymerization*, referenced above.

The term "sol" means the soluble content or non-gel portion of the gel prepared in a heated stirred tank. The "sol" in this invention is soluble in water.

The polymers of this invention may be made in a novel two step procedure. First a prepolymer or pre-gel is prepared in a stirred tank. A suitable stirred tank can be found on page 132 of *Principles of Polymerization*, $2^{nd}$ edition, referred to supra. Suitable reaction temperatures for the first step are from about 80 to about 250° C., preferably from about 100 to about 250° C. Suitable reaction times for making the prepolymer or pre-gels are from about 0.5 hours to about 24 hours. The first step is generally carried out at atmospheric pressure. However, vacuum can be used if desired to minimize reaction temperatures and reaction times. Suitable vacuum pressure ranges are from about 1 to about 200 mm Hg.

In the second step, the prepolymer or pre-gel is further condensed and polymerization is completed in a single screw or twin screw extruder at temperatures of from about 200 to about 300° C. for about 0.1 hours to about 0.5 hours. Twin screw extruders such as Werner Pfleiderer extruders are preferred for the finishing step. Other suitable equipment includes Readco Extruders, Sigma Blade Mixers, Brabender Plastographs and the like.

The water extractable content of the finished polymers should be less than 10 weight % and preferably less than 1 weight %.

Biodegradable as used herein is meant to describe an aliphatic polyester that is easily degradable and not highly crystallized. The mechanism of degradation is by de-esterification causing chain cleavage. The de-esterification process can occur either enzymatically, i.e., organisms, or by environmental factors such as air and especially water. The rate of biodegradation of the crosslinked branched aliphatic biodegradable polyesters can be determined by ASTM method D5209 (Determination of Biodegradation of Plastic Materials in the Presence of Municipal Sewage Sludge). The rate of biodegradation should be at least equal to the rate of degradation of kraft paper using the ASTM D5209 procedure. Upon visual observance of the biodegradation of the crosslinked branched aliphatic biodegradable polyester, the biodegradable polyester exhibited low viscosity or a syrup-like consistency.

As previously noted, the crosslinked branched aliphatic biodegradable polyesters of the present invention can be used in the base formulations and/or chewing gum formulations. In this regard, the polyesters can be used as elastomers and/or elastomeric plasticizers. As part of a gum base, the edible polyesters can comprise from abut 1% to about 80% by weight of the gum base. As part of the chewing gum, the crosslinked branched aliphatic biodegradable polyesters can comprise from about 0.1 to about 70% by weight of the chewing gum.

The crosslinked branched aliphatic biodegradable polyesters can be used in a variety of different chewing gum and base formulations. Chewing gum generally consists of a water insoluble gum base, a water soluble portion, and flavoring agents.

The insoluble gum base generally comprises elastomers, resins, fats and oils, softeners and inorganic fillers. The gum base may or may not include wax. The insoluble gum base can constitute from about 5 to about 95% by weight of the chewing gum. More commonly, the gum base comprises from about 10 to about 50% by weight of the gum, and in some preferred embodiments, from about 20 to about 35% by weight of the chewing gum.

In another embodiment, the invention provides that the gum base is wax-free, non tacky, or a bubble gum-type base.

In one embodiment, the chewing gum base of the present invention comprises from about 1 to 80% by weight crosslinked branched aliphatic biodegradable polyester, from about 20 to about 60% by weight synthetic elastomer, from about 0 to about 30% by weight natural elastomer, from about 5 to about 55% by weight elastomeric plasticizer, from about 4 to abut 35% by weight filler, from about 5 to about 35% by weight softener, and optional minor amounts (about 1% or less) of miscellaneous ingredients such as colorants, antioxidants, etc.

Synthetic elastomers may include, but are not limited to, polyisobutylene with a GPC weight average molecular weight of about 10,000 to about 95,000 isobutylene-isoprene copolymer (butyl elastomer), styrene-butadiene copolymers having styrene-butadiene ratios of about 1:3 to about 3:1, polyvinyl acetate having a GPC weight average molecular weight of about 2,000 to about 90,000, polyisoprene, polyethylene, vinyl acetate-vinyl laurate copolymer having a vinyl laurate content of from about 5 to about 50% by weight of the copolymer, and combinations thereof.

Preferred ranges are, for polyisobutylene, 50,000 to 80,000 GPC weight average molecular weight, for styrene-butadiene, 1:1 to 1:3 bound styrene-butadiene, for polyvinyl acetate, 10,000 to 65,000 GPC weight average molecular weight with the higher molecular weight polyvinyl acetates typically used in bubble gum base, and for vinyl acetate-vinyl laurate, vinyl laurate content of from about 10 to 45%.

If used, natural elastomers may include natural rubber such as smoked or liquid latex and guayule as well as natural gums such as jelutong, lechi caspi, perillo, sorva, massaranduba balata, massaranduba chocolate, nispero, rosindinha, chicle, gutta hang kang, and combinations thereof. The preferred synthetic elastomer and natural elastomer concentrations vary depending on whether the chewing gum in which the base is used is adhesive or conventional, bubble gum or regular gum, as discussed below. Preferred natural elastomers include jelutong, chicle, sorva, and massaranduba balata.

If used, elastomer plasticizers may include, but are not limited to natural rosin esters, often called estergums, such as glycerol esters of partially hydrogenated rosin, glycerol esters polymerized rosin, glycerol esters of partially dimerized rosin, glycerol esters of rosin, pentaerythritol esters of partially hydrogenated rosin, methyl and partially hydrogenated methyl esters of rosin, pentaerythritol esters of rosin; synthetics such as terpene resins derived from alpha-pinene, beta-pinene, and/or d-limonene; and any suitable combinations thereof. The preferred elastomer plasticizers will also vary depending on the specific application, and on the type of elastomer which is used.

Fillers/texturizers may include magnesium and calcium carbonate, ground limestone, silicate types such as magnesium and aluminum silicate, clay, alumina, talc, titanium oxide, mono-, di- and tri-calcium phosphate, cellulose polymers, such as wood, and combinations thereof.

Softeners/emulsifiers may include tallow, hydrogenated tallow, hydrogenated and partially hydrogenated vegetable oils, cocoa butter, glycerol monostearate, glycerol triacetate, lecithin, mono-, di- and triglycerides, acetylated monoglycerides, fatty acids, such as stearic, palmitic, oleic and linoleic acids and combinations thereof.

Colorants and whiteners may include FD&C-type dyes and lakes, fruits and vegetable extracts, titanium dioxide and combinations thereof.

The gum base may or may not include wax. An example of a wax-free gum base is disclosed in U.S. Pat. No. 5,286,500, the disclosure herein which is incorporated by reference.

In addition to a water insoluble gum base portion, a typical chewing gum composition includes a water soluble bulk portion and one or more flavoring agents. The water soluble portion can include bulk sweeteners, high intensity sweeteners, flavoring agents, softeners, emulsifiers, colors, acidulant, fillers, antioxidants, and other components that provide desired attributes.

The softeners, which are also known as plasticizers and plasticizing agents, generally constitute from about 0.5 to about 15% by weight of the chewing gum. The softeners may include glycerin, lecithin, and combinations thereof. Aqueous sweetener solutions such as those containing sorbitol, hydrogenated starch hydrosylates, corn syrup and combinations thereof, may also be used as softeners and binding agents in chewing gum.

Bulk sweeteners include both sugar and sugarless components. Bulk sweeteners typically constitute from about 5 to about 95% by weight of the chewing gum, more preferably 20 to 80% by weight, and even more preferably, 30 to 60% by weight of the gum.

Sugar sweeteners generally include saccharide-containing components commonly known in the chewing gum art, including, but not limited to, sucrose, dextrose, maltose, dextrin, dried invert sugar, fructose, galactose, corn syrup solids, and the like, alone or in combination.

Sorbitol can be used as a sugarless sweetener. Additionally, sugarless sweeteners can include, but are not limited to other sugar alcohols, such as mannitol, hydrogenated isomoltulose (palatinit), xylitol, hydrogenated starch hydrosylates, malitol, lactitol and the like, alone or in combination.

High intensity artificial sweeteners can also be used in combination with the above. Preferred sweeteners include, but are not limited to sucralose, aspartame, salts of acesulfame, alitame, saccharin and its salts, cyclamic acid and its salts, glycyrrhizin, dihydrochalcones, thaumatin, monellin, and the like, alone or in combination. In order to provide longer lasting sweetness and flavor perception, it may be desirable to encapsulate or otherwise control the release of at least a portion of the artificial sweetener. Such techniques as wet granulation, wax granulation, spray drying, spray chilling, fluid bed coating, coacervation, and fiber extrusion may be used to achieve the desired release characteristics.

Usage level of the artificial sweetener will vary greatly and will depend on such factors as potency of the sweetener, rate of release, desired sweetness of the product, level and type of flavor used and cost considerations. Thus, the active level of artificial sweetener may vary from about 0.02 to about 8%. When carriers used for encapsulation are included, the usage level of the encapsulated sweetener will be proportionately higher.

Combinations of sugar and/or sugarless sweeteners may be use in chewing gum. Additionally, the softener may also provide artificial sweetness such as with aqueous sugar or alditol solutions.

If a low calorie gum is desired, a low caloric bulking agent can be used. Examples of low caloric bulking agents include, polydextrose, Raftilose, Raftilin; Fructooligosaccharides (Nutra Flora); Palatinose oligosaccharide, Guar gum hydrosylate (Sun Fiber) or indigestible dextrin (Fibersol). However, other low calorie bulking agents can be used.

A variety of flavoring agents can be used. The flavor can be used in amounts of from about 0.1 to about 15% weight of the gum, and preferably from about 0.2 to about 5% weight. Flavoring agents may include essential oils, synthetic flavors or mixtures thereof, including, but not limited to oils derived from plants and fruits, such as citrus oils, fruits essences, peppermint oil, spearmint oil, other mint oils, clove oil, oil of wintergreen, anise and the like. Artificial flavoring agents and components may also be used. Natural and artificial flavoring agents may be combined in any sensorially acceptable fashion.

The present invention, can be used with a variety of processes for manufacturing chewing gum. Chewing gum is generally manufactured by sequentially adding the various chewing gum ingredients to commercially available mixers known in the art. After the ingredients have been thoroughly mixed, the chewing gum mass is discharged from the mixer and shaped into the desired form, such as by rolling into sheets and cutting into sticks, extruding into chunks, or casting into pellets.

Generally, the ingredients are mixed by first melting the gum base and adding it to the running mixer. The gum base may alternatively be melted in the mixer. Color and emulsifiers can be added at this time.

A chewing gum softener, such as glycerin can be added next along with part of the bulk portion. Further parts of the bulk portion may then be added to the mixer. Flavoring agents are typically added with the final part of the bulk portion. The entire mixing process typically takes from five to fifteen minutes, although longer mixing times are sometimes required.

EXAMPLES

The following examples are put forth so as to provide those of ordinary skill in the art with a complete disclosure and description of how the compounds claimed herein are made and evaluated, and are intended to be purely exemplary of the invention and are not intended to limit the scope of what the Inventors regard as their invention. Efforts have been made to ensure accuracy with respect to numbers (e.g., amounts, temperature, etc.) but some errors and deviations should be accounted for. Unless indicated otherwise, parts are parts by weight, temperature is in ° C. or is at room temperature, and pressure is at or near atmospheric.

Example 1A

Preparation of Adipic Acid/glycerinlnalmitic Acid Pre-gel

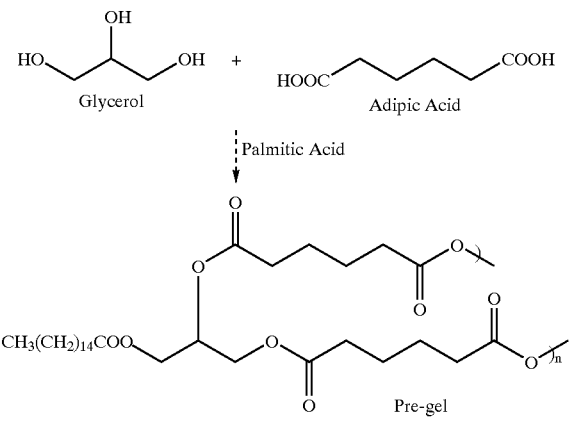

The formula for palmitic acid is $CH_3(CH_2)_{14}CO_2H$

To a 5-liter heated round-bottom flask equipped with agitator, thermometer, condenser, and Dean Stark trap, 1246 g of glycerol (40.6 equivalents) was added. The glycerol was heated to about 100 C. While maintaining agitation and temperature at >80° C., 1068 g of palmitic acid (4.2 equivalents) was added in shots. No exotherm occurred and the palmitic acid melted at 61–64° C. The batch of glycerol and palmitic acid was heated to 100° C. and maintained at a temperature of 100–120° C., as 2506 g of adipic acid (34.3 equivalents) was added in shots. Very little exotherm occurred during the addition of adipic acid, but the batch thickened as more adipic acid was added. After all the adipic acid was added, the batch was heated to 150–200° C. and water was taken off at atmospheric pressure using a Dean Stark trap. Water was continuously removed from the Dean stark trap as it distilled at 150–160° C. Plugging of the Dean Stark trap stopcock by palmitic acid was monitored, especially after about half of the water was collected, about 437 g of water. The 437 g of water collected was 63% of theoretical (693 g). Gelation began to occur after about 77% of the water was removed (534 g of water in this case).

After collecting the proper amount of water, heating was discontinued and the Dean Stark trap removed. The batch was placed on total reflux and the temperature of the batch allowed to drop to about 120° C. The hot reaction mixture was poured into an approved container.

The expected yield is about 4383 g (9.65 lb). The density is 1.2 g/mL or 10 lb/gal.

Example 1B

Reactive Extrusion to Yield Gum Base

The pre-gel from the previous example was heated to 80–100° C. in a metering tank, where upon it liquefied. It was then fed into the extruder.

The water vapor formed during the extrusion process was vented to the atmosphere. The hot gum exiting from the extruder was collected, cooled, and packaged.

Extruder Description:
  Werner & Pfleiderer 30 mm
  Co-rotating, intermeshing twin screws
  L:D*=40:1
  Equipped with nitrogen purge
  No vacuum used Extrusion Conditions:
  Operating temperature=260–270° C.
  Screw speed=70 rpm
  Feed rate=17 lb/hr
  ATM vent at barrel #12
  Nitrogen flow=75 scfh
  L:D*40:1

*L:D ratio changed by moving point of addition of feed.

Example 2A

Preparation of Adipic Acid/glycerin Pre-gel

To a 1-liter heated resin kettle equipped with agitator, thermometer, condenser and Dean Stark trap, 168 g glycerin (5.48 equivalents) was added and heated to 70–80° C. Under agitation, 400 g adipic acid (5.48 equivalents) was added in shots. The batch of glycerin and adipic acid was heated to 150–200° C. and water removed at atmospheric pressure using a Dean Stark trap. Water was continuously removed from the Dean Stark trap as it distilled over. The temperature that the water began to distill was 150–160° C. The amount of water collected was 50 g, which is 51% of theoretical (98.6 g). Gelation began to occur after about 73% of the water was removed (72 g of water in this case).

After the proper amount of water was collected, heating was discontinued, and the Dean Stark trap removed. The batch was placed on total reflux and the temperature of the batch allowed to drop to about 120° C. The reaction mixture was poured into an approved container.

The expected yield is about 518 g (1.1 lb). The density is 1.2 g/mL or 10 lb/gal.

Example 2B

Reactive Extrusion to Yield Gum

The pre-gel from example 2A was heated to 80–100° C. in a metering tank, where upon it liquefied. It was then fed into the extruder. Water vapor formed during the extrusion process was vented to the atmosphere. The hot gum exiting from the extruder was collected, cooled, and packaged.

Extruder Description:
  Werner & Pfleiderer 30 mm
  Co-rotating intermeshing twin screws
  L:D*=40:1
  Equipped with nitrogen purge
  No vacuum used Extrusion Conditions:
  Operating temperatures=260–265° C.
  Screw speed=70 rpm
  Feed rate=17 lb/hr
  ATM vent at barrel #12
  Nitrogen flow=75 scfh
  L:D*=24:1

*L:D ratio changed by moving point of addition of feed.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A process for making a crosslinked branched aliphatic biodegradable polyester comprising:
   (a) reacting at least one polyol having from three to four hydroxy groups, or ester thereof, at least one dibasic acid, or ester thereof, and at least one long chain monocarboxylic acid, or ester thereof, at a temperature and time sufficient to form a pre-gel;
   (b) crosslinking the pre-gel by extruding the pre-gel at a temperature and time sufficient to provide a crosslinked branched aliphatic biodegradable polyester.

2. The process of claim 1, wherein the polyol is from $C_4$ to $C_5$.

3. The process of claim 1, wherein the dibasic acid contains from 3 to 9 carbon atoms.

4. The process of claim 1, wherein the long chain monocarboxylic acid contains from 12 to 26 carbons.

5. The process of claim 1, wherein the polyol is selected from the group consisting of glycerol and pentaerythritol, the dibasic acid is selected from the group consisting of malonic, succinic, tartaric, malic, citric, fumaric, glutaric, adipic, pimelic, sebacic, suberic, and azelaic acid, and the monocarboxylic acid is selected from the group consisting of lauric, myristic, palmitic, stearic, arachidic, cerotic, dodecylinic, palmitoleic, oleic, linoleic, and erucic acid.

6. The process of claim 1, further comprising repeat units formed from an alcohol, a polyol or a derivative thereof comprising propylene glycol, 1,3-butanediol, triacetin, triemthylolpropane, pentaerythritol, cellulose ether, cellulose ester, lauryl alcohol, myristyl alcohol, cetyl alcohol or stearyl alcohol.

7. The process of claim 1, wherein the polyol, dibasic acid and long chain monocarboxylic acid are reacted at temperatures of from about 80° C. to about 250° C. to form a pre-gel.

8. The process of claim 1, wherein the polyol, dibasic acid and long chain monocarboxylic acid are reacted at temperatures of from about 100° C. to about 250° C. to form a pre-gel.

9. The process of claim 1, wherein the pre-gel is extruded at temperatures of from about 200° C. to about 300° C.

10. The process of claim 1, wherein the alcohol, dibasic acid and monocarboxylic acid are reacted for from about 0.5 hours to about 24 hours to form a pre-gel.

11. The process of claim 1, wherein the pre-gel is extruded for from about 0.1 hours to 0.5 hours.

12. The process of claim 1, wherein the polyester is wax-free.

13. The process of claim 1, wherein the polyester is non-tacky.

14. The process of claim 1, wherein the polyester is a bubble gum-type base.

15. A process for making a crosslinked branched aliphatic biodegradable polyester comprising:
   (a) reacting at least one polyol having from three to four hydroxy groups, or ester thereof, and at least one dibasic acid, or ester thereof at a temperature and time sufficient to form a pre-gel;
   (b) crosslinking the pre-gel by extruding the pre-gel at a temperature and time sufficient to provide a crosslinked branched aliphatic biodegradable polyester.

* * * * *